US009648088B1

United States Patent
Pande et al.

(10) Patent No.: US 9,648,088 B1
(45) Date of Patent: May 9, 2017

(54) DIGITAL CONTENT PREFETCH FOR TRAVEL

(71) Applicant: Amazon Technologies, Inc., Reno, NV (US)

(72) Inventors: Aditya Balwant Pande, Seattle, WA (US); Wesley Shawn Davis, Seattle, WA (US); Gustavo Eduardo Lopez, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 409 days.

(21) Appl. No.: 14/225,347

(22) Filed: Mar. 25, 2014

(51) Int. Cl.
G06Q 30/06 (2012.01)
G06Q 30/02 (2012.01)
H04L 29/08 (2006.01)
G06F 17/30 (2006.01)
G06Q 20/12 (2012.01)

(52) U.S. Cl.
CPC ........ H04L 67/10 (2013.01); G06F 17/30876 (2013.01); G06Q 20/123 (2013.01); G06Q 30/0252 (2013.01); G06Q 30/0255 (2013.01); G06Q 30/0631 (2013.01); *G06Q 30/0257* (2013.01); *G06Q 30/0601* (2013.01)

(58) Field of Classification Search
CPC ........... G06Q 30/0252; G06Q 30/0255; G06Q 30/0257; G06Q 30/0601; G06Q 30/0631
USPC ................ 705/14.5, 14.53, 14.55, 26.1, 26.7
See application file for complete search history.

(56) References Cited

U.S. PATENT DOCUMENTS

| 5,774,868 | A  | * | 6/1998 | Cragun  | G06Q 30/02 705/14.1 |
| 6,266,649 | B1 | * | 7/2001 | Linden  | G06Q 10/08345 705/14.51 |
| 6,680,919 | B1 | * | 1/2004 | Rauhala | H04M 1/72525 342/358 |

(Continued)

FOREIGN PATENT DOCUMENTS

| EP | 2180664 A1 | * | 4/2010 |
| WO | WO-2011/054912 A1 | * | 5/2011 |

OTHER PUBLICATIONS

MacDonald, B., "Benchley Strikes Again; This Time With a Killer Squid," Boston Globe, Jul. 27, 1991.*

(Continued)

*Primary Examiner* — Nicholas D Rosen
(74) *Attorney, Agent, or Firm* — Lee & Hayes, PLLC

(57) ABSTRACT

This disclosure is generally directed to providing access to media content for travelers during a trip, where the trip may include lodging, transit, and/or activities. A service provider may obtain information about a user and a trip. The service provider may determine information about the user, such as account information that may identify media content that is typically accessible by the user. An amount of available space on a device may be determined that can be used to store prefetched content for the trip. Recommended content may be selected to fill the amount of space on the device. The recommended content may be based on information about the user, information about the trip, and/or other information. The recommended content may be downloaded onto the device prior to the trip so that the user has access to the content from the device during the trip.

20 Claims, 9 Drawing Sheets

(56) References Cited

U.S. PATENT DOCUMENTS

| | | | | |
|---|---|---|---|---|
| 6,782,370 B1* | 8/2004 | Stack | ............... | G06Q 30/02 705/26.1 |
| 8,023,966 B2* | 9/2011 | Aaltonen | ............... | H04L 67/06 455/404.2 |
| 8,032,472 B2* | 10/2011 | Tsui | ............... | H02J 7/0055 706/46 |
| 8,396,759 B2* | 3/2013 | Mehta | ............... | G06Q 30/0282 455/456.3 |
| 8,655,970 B1* | 2/2014 | Cohen | ............... | G06Q 30/00 455/412.2 |
| 8,745,047 B2* | 6/2014 | Fein | ............... | H04L 12/2812 707/732 |
| 8,909,476 B2* | 12/2014 | Tuukkanen | ............... | G01C 21/26 340/995.19 |
| 9,326,026 B2* | 4/2016 | Ramakrishnan | ............... | H04N 21/454 |
| 9,355,378 B2* | 5/2016 | Williams | ............... | G06Q 30/0625 |
| 2005/0108069 A1* | 5/2005 | Shiran | ............... | G06Q 10/02 705/5 |
| 2006/0116965 A1* | 6/2006 | Kudo | ............... | G06Q 99/00 705/52 |
| 2006/0135179 A1* | 6/2006 | Aaltonen | ............... | H04L 67/06 455/456.3 |
| 2007/0089110 A1* | 4/2007 | Li | ............... | H04L 67/2847 717/178 |
| 2007/0185744 A1 | 8/2007 | Robertson | | |
| 2008/0092158 A1* | 4/2008 | Bhatnagar | ............... | H04N 7/17318 725/34 |
| 2008/0167801 A1* | 7/2008 | Geelen | ............... | G01C 21/3641 701/533 |
| 2008/0249969 A1* | 10/2008 | Tsui | ............... | H02J 7/0055 706/46 |
| 2010/0057778 A1* | 3/2010 | Fein | ............... | G06F 17/30867 707/E17.009 |
| 2010/0161311 A1* | 6/2010 | Massuh | ............... | G06F 17/3087 704/7 |
| 2011/0320307 A1* | 12/2011 | Mehta | ............... | G06Q 30/0282 705/26.7 |
| 2012/0311726 A1* | 12/2012 | Nam | ............... | H04L 63/083 726/29 |
| 2013/0253833 A1* | 9/2013 | Tuukkanen | ............... | G01C 21/26 701/538 |
| 2014/0279250 A1* | 9/2014 | Williams | ............... | G06Q 30/0625 705/26.62 |
| 2015/0121413 A1* | 4/2015 | Ramakrishnan | ............... | H04N 21/454 725/25 |
| 2016/0223332 A1* | 8/2016 | Chesnutt | ............... | G01C 21/20 |

OTHER PUBLICATIONS

Nagle, A, "Something You Can Book on in Your Car: Audiotapes You Can Hear Many Authors Tell Their Stories While Driving Your Vehicle," The Post—Standard, syracuse, N.Y., p. 27, Aug. 26, 1999.*

Anon., "HMSHost Lands Exclusive Agreement to Sell Amazon Kindle in Airports," Business Wire, Jun. 28, 2010.*

Office Action for U.S. Appl. No. 14/225,322, mailed on Oct. 7, 2016, Pande et al., "Media Content Access for Travelers", 20 pages.

Office action for U.S. Appl. No. 14/225,322, mailed on Mar. 23, 2017, Pande et al., "Media Content Access for Travelers", 26 pages.

* cited by examiner

DIGITAL CONTENT PREFETCH FOR TRAVEL

RELATED APPLICATION

The present application is related to concurrently filed U.S. patent application Ser. No. 14/225,322, entitled "Media Content Access For Travelers", to Pande, et al., the entire contents of which is hereby incorporated herein in its entirety.

BACKGROUND

Computing devices have become commonplace in almost every environment. For example, mobile telephones, laptop computers, and tablet computers are commonly used for work and pleasure and accompany people in many daily activities. People often travel with computers and mobile phones, bring these devices to school, and use these devices in public places.

Many people frequently use these devices to access media content, such as videos, audio, and documents, which may be accessible via a network from a remote storage location such as a cloud services provider. Some of this media content may be owned by individual users while other content may be accessible through a subscription service, provided free of charge, or provided using other content management schemes.

In some situations, some computing devices may not have or provide convenient access to this media content. For example, when a person is traveling and is using a shared device that is frequently used by other people (e.g., a smart television in a hotel room, an in-seat video player in an aircraft, etc.), the shared device may not be conveniently configured for the user to access the user's media content. In some situations, a device may not have typical network access due to limitations on network activity (e.g., filtered activities) and/or due to lack of network connectivity. For example, when a user is traveling in an aircraft, the user may have limited or no network connectivity to enable access to data from some content providers, but may have access to other types of content from other sources, such as local content provided by a computing device in the aircraft.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
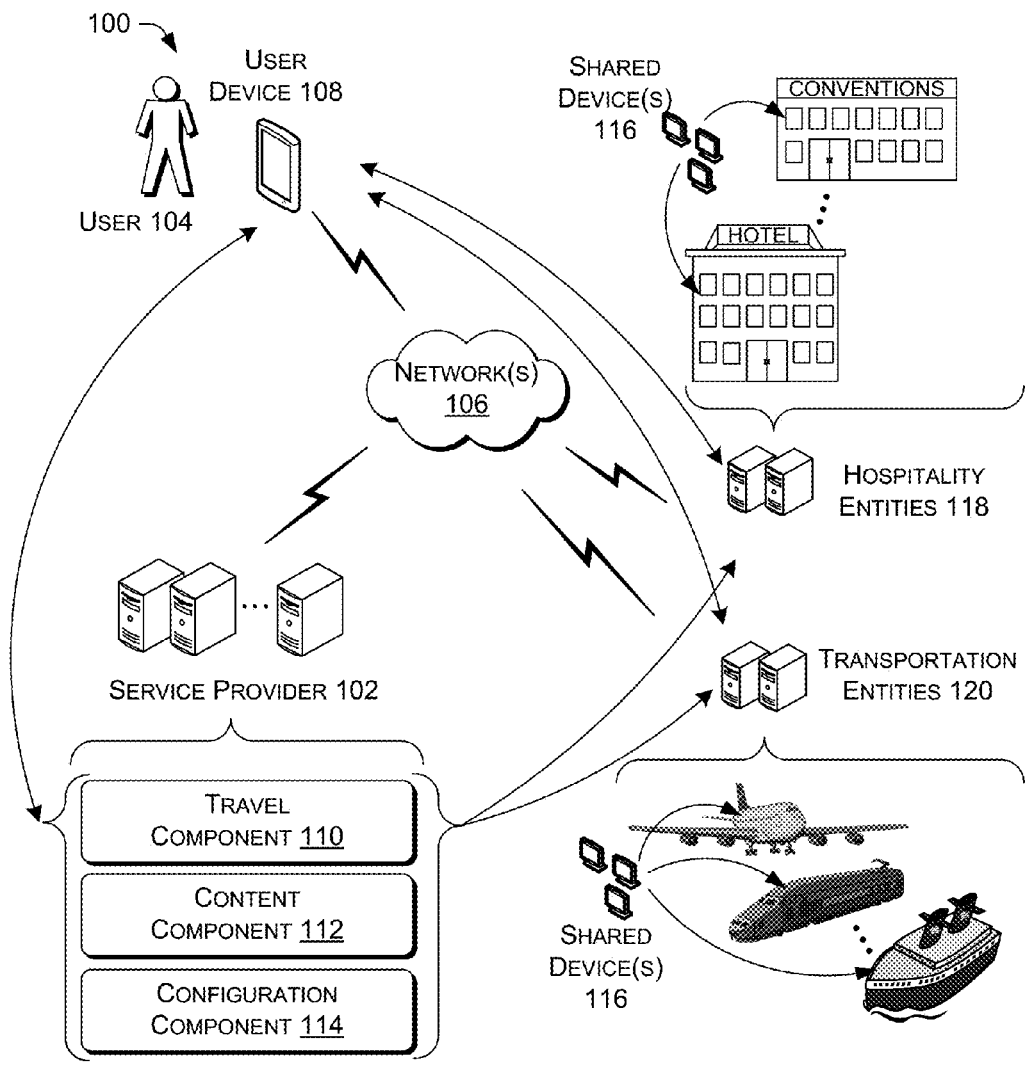
FIG. 1 is a schematic diagram of an illustrative computing environment that provides media content access for travelers.

This disclosure is generally directed to providing access to media content for travelers during a trip, where the trip may include lodging, transit, and/or activities. Often, when traveling, users are exposed to shared computing devices that may not easily be configured to access content that the users' desire, such as subscription based media content and personal content that is stored in a remote network-accessible repository. In some situations, such as during transit by air, over land, or sea, the computing devices may have limited or no access to some remotely located data, such as streamed data that is made inaccessible to the computing devices due to limitations of bandwidth by the mode of transit (e.g., by an aircraft or ship).

In some embodiments, a service provider may obtain information about a user and a trip. The service provider may obtain the information by booking the trip, by assisting in booking the trip, and/or by obtaining the information from a party involved in the booking of the trip (including the traveler). The service provider may determine information about the user, such as account information that may identify media content that is typically accessible by the user or media content that the user may desire to access during the trip. The service provider may transmit a message to an entity that provides lodging and/or transportation for the user during the trip. The message may request the entity to configure a shared computing device, which is made accessible by the entity for the user, so that the user can access the media content via the configured computing device.

As an example, the entity may be a hotel or associated with a hotel and the shared computing device may be a television or set top box in a room assigned to the user during a stay at the hotel. The configuration request may request the hotel to provide special access by the shared computing device during the extent of the user's stay at the hotel so that the user can access desired media content such as subscription-based media content that the user typically has access to elsewhere (e.g., via his home computing device, etc.).

In another example, the entity may be a transportation provider, such as an airline company that has booked the user for a seat in an aircraft for a specific flight. The service provider may request the entity to prefetch some content for storage on a local storage device of an aircraft prior to the specific flight. At least some of the prefetched media content may be made accessible to the user during the specific flight. In some embodiments, the content may be prefetched for the user based at least in part on preferences of the user. The prefetched content may be made available for exclusive use by the user and/or for use by some other users, while possibly restricting other users from accessing at least some of the prefetched content.

In accordance with one or more embodiments, at least some of the content may be selected based on information associated with the trip. For example, when the trip includes travel to another country, the content may include language resources, maps, cultural information, and/or other relevant information that may be provided via one or more of video, audio, and/or documents (e.g., text files, images, maps, etc.). In some embodiments, the media content may be provided as a promotion associated with booking of the trip.

In some embodiments, content may be downloaded, with little or no interaction by the traveler, to a user device associated with a traveler prior to a trip. For example, a service provider and/or the user device may identify a trip and a time frame associated with the trip. An amount of content to be downloaded may be determined. Specific content may be selected to fill the amount. The specific content may be recommended content based on factors such as the traveler's history of content consumption, recent trends, and so forth. The user device may download the specific content prior to the trip with little or no input by the user. In some instances, payment for some of the content may be initiated after download of the content, and just before consumption of the content or after consumption of the content (e.g., after the user device regains network connectivity).

The techniques and systems described herein may be implemented in a number of ways. Example implementations are provided below with reference to the following figures.

Illustrative Environment

FIG. 1 is a schematic diagram of an illustrative computing environment 100 that provides media content access for travelers. As shown, the environment 100 includes a service provider 102 that may provide or assist in providing media content access to travelers, such as a user 104. The media content may include videos (e.g., streaming movies, shows), audio (e.g., steaming audio), and/or documents (e.g., text documents, images, files). The service provider 102 may be hosted by one or more computing devices and may communicate with other computing devices via one or more networks 106. The networks 106 may include wireless and wired networks, including mobile telephone networks, wide area networks, and so forth.

The service provider 102 may communicate with one or more users, which may include the user 104. The user 104 may use a user device 108 to communicate with the service provider 102. The user device 108 may be virtually any type of electronic device or computing device that can exchange information with another device, such as a mobile telephone, a mobile computer, a tablet computer, a desktop computer, a set top box, a smart television, a gaming console, an electronic book reader device, and/or other types of electronic devices. The service provider 102 may provide data to the user device 108 through a browser, a dedicated application or "app", and/or through messaging services such as short message service (SMS), email, and other messaging services.

The service provider 102 may include various components to enable providing or assisting in providing media content access to travelers. The components may include a travel component 110, a content component 112, and a configuration component 114. However, in some embodiments, at least some of these components may be at least partially implemented by other entities. For example, a first entity may include the travel component 110 to book travel, a second entity may include the content component 112 to stream content to users, and/or a third entity may include the configuration component 114 to configure media access by users during a trip. The service provider 102 may represent any combination of these entities when entities perform separate portions of these processes.

The travel component 110 may determine information about a trip that is planned for the user 104. In some embodiments, the information may be determined by booking some or all parts of a trip for the user 104. In various embodiments, information about a trip (or portions thereof) may be received from an entity associated with the trip (e.g., the user 104, a provider of lodging, a travel service, a provider of transportation, etc.). The trip may include one or more of lodging, transportation, and/or other activities. Information amount the trip may include information about participants, a time range (duration), lodging, transportation, and so forth. Examples of lodging may include stays at a hotel, a time share, a hostel, an extended stay lodge, a cruise ship, or other lodging of virtually any length of time. Examples of transportation may include air travel, travel by water (e.g., cruise ship), travel by rail (e.g., train) or road (e.g., tour bus), and so forth. Other activities may include attendance at a convention or restaurant and/or other activities where the user may use a shared device and/or desire access to media content that may otherwise require configuration and/or special access.

A content component 112 may determine regular media content accessed by the user 104 during regular use (other than during a trip) and may determine selected media content that is to be made available to the user 104 during the trip. The regular media content may include content owned by the user 104, free content, and/or paid content that is available to the user through normal use when the user is not traveling. The regular media content may not otherwise be available to the user during travel due to use of shared devices (e.g., devices associated with at a place of lodging and/or a transportation service), due to limited bandwidth, and/or due to other restrictions.

In some embodiments, the content component 112 may provide content for access by the user 104. For example, the content component 112 may stream media content for access to the user. The content component 112 may include content or access to content provided by other sources, such as other content providers. The content component 112 may monitor access to media content by the user 104 to obtain history that may be used for various purposes such as to determine preferences and recommendations for the user 104. The media content may include one or more of free content, paid content, and/or owned content (e.g., owned by the user 104). The free content may include content that is restricted to use by the user (e.g., promotional content, etc.) and content that is made available to all users (e.g., publically accessible).

A configuration component 114 may configure access to the selected media content for use by the user device 108 and/or shared devices 116, which may be used by the user 104 when the user is traveling. As used herein, the term "traveling" may include any activity participated in by the user 104 (e.g., dining, convention, etc.), as well as lodging and transportation used by the user 104 where the user does not regularly access the media content. An example of configuration of the media content may include configuration of the shared device 116 in a hotel (e.g., in room television or set top box) so that user 104 can access the media content during her stay at the hotel while excluding other guests from accessing the media content. Another example of configuration of the media content includes prefetching a least some of the selected media content for the user prior to transportation that has limited or no available bandwidth and/or network connectivity. For example, some content may be prefetched to a local device (e.g., server on an aircraft, the user device 108, etc.) before the user begins the travel so that the content is accessible by the user during the travel using the user device 108 and/or the shared device 116.

Shared devices 116 may include any device that the user 104 may use during a trip to access the media content. Examples of possible shared devices include hotel televisions and set top boxes, kiosks, aircraft video players, and/or other devices that are typically under control or exclusive control of the user 104 during a portion of the trip, such as devices accessible in a room assigned to the user 104, devices for a seat assigned to the user 104, and so forth. The shared devices may include virtually any type of electronic device or computing device that can exchange information with another device, such as a mobile computer, a tablet computer, a desktop computer, a set top box, a smart television, a gaming console, an electronic book reader device, and/or other types of electronic devices. In some embodiments, the shared device 116 may include a server of an entity associated with the user's trip, such as a server on an aircraft used to transport the user 104.

As illustrated in the environment 100, the user 104 may use the user device 108 to interact with the travel component 110, the content component 112, and/or the configuration component 114. The service provider 102 may then interact with various entities through outputs from the travel component 110, the content component 112, and/or the configuration component 114. The various entities may include hospitality entities 118 such as hotels, meeting halls, convention centers, and so forth. The hospitality entities 118 may have consistent access to high bandwidth network connectivity, which may be subject to typical fluctuations and periodic outages that are inherent in network connectivity. The various entities may include transportation entities 120 such as aircraft, trains, buses, cruise ships, and so forth. The transportation entities 120 may have inconsistent access to high bandwidth network connectivity, which may be limited or unavailable when the transportation entities are in particular regions or areas (e.g., when off to sea, during flight, etc.). The hospitality entities 118 and the transportation entities 120 may include the shared devices 116, which may be available for exclusive control by the user 104 during at least part of the trip. As used herein, the term "exclusive control" means that the user 104 has control over the device, but may allow others to use the device, view content on the device, or otherwise interact with the device. For example, the user 104 may have exclusive control over a video player associated with his/her seat in an aircraft, but may not be able to prevent others (e.g., adjacent passengers, etc.) from viewing content on the device. The exclusive control may include an associated a time range, such as a start time and an end time associated with the user's trip. For example, the user 104 may have exclusive control of the video player associated with his/her seat in an aircraft from takeoff to landing for a booked flight, but not on a subsequent flight of the aircraft of which the user 104 is not a passenger or is reassigned to a different seat.

Illustrative Computing Architecture

Figure 2A:
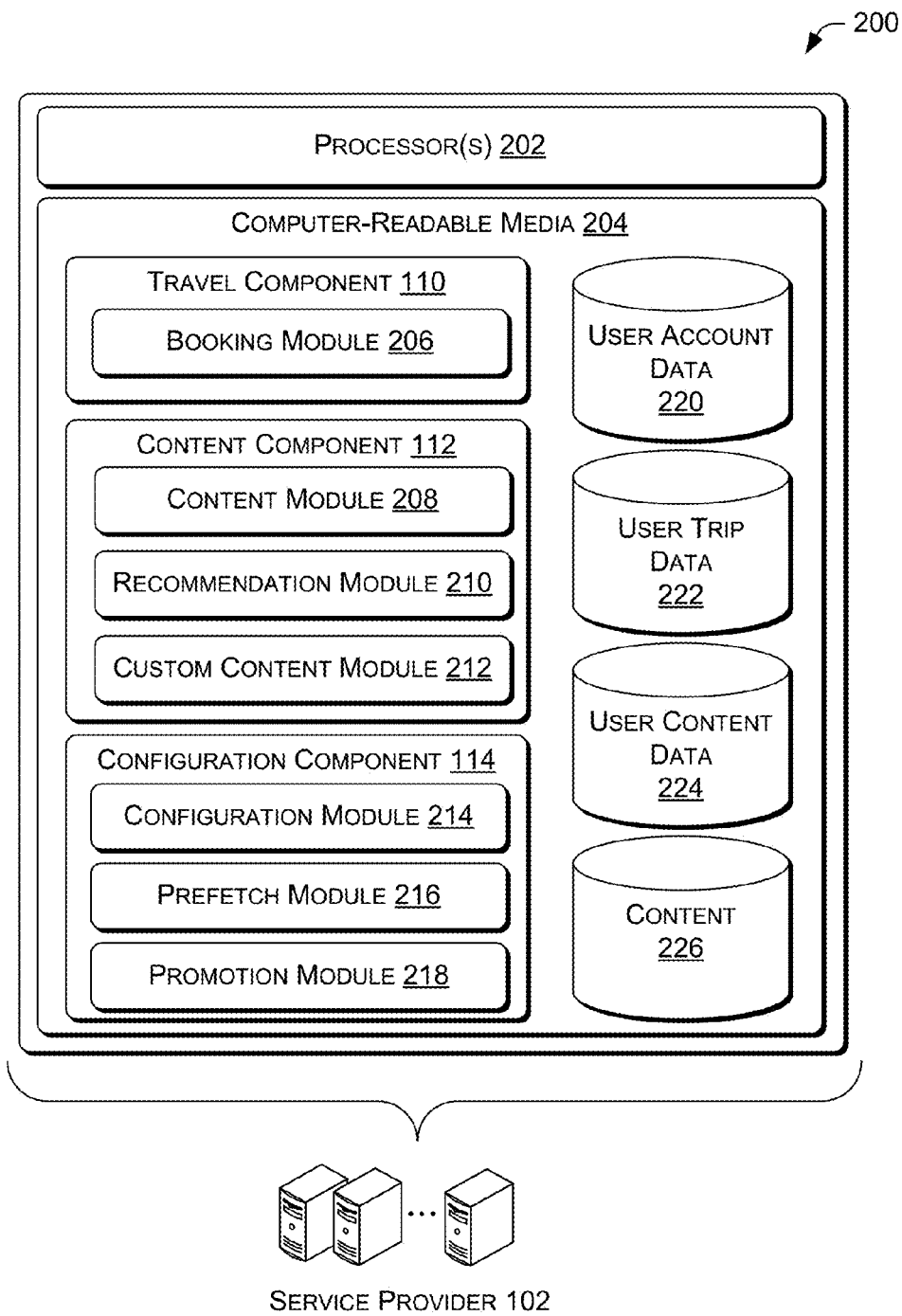
FIG. 2A is a schematic diagram of an illustrative computing architecture of a service provider that facilitates providing access to media content for travelers.

FIG. 2A is a schematic diagram of an illustrative computing architecture 200 of a service provider that facilitates providing access to media content for travelers. The computing architecture 200 may be implemented in a distributed or non-distributed computing environment.

The computing architecture 200 may include one or more processors 202 and one or more computer readable media 204 that stores various modules, applications, programs, or other data. The computer-readable media 204 may include instructions that, when executed by the one or more processors 202, cause the processors to perform the operations described herein for the service 104.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

In some embodiments, the computer-readable media 204 may store the travel component 110, the content component 112, and the configuration component 114, as well as various modules associated therewith and data associated therewith.

The travel component 110 may include a booking module 206 that may book at least a portion of the trip for the user 104 and/or access booking data for the user 104. For example, the booking module 206 may book or schedule lodging, transportation, and/or activities for the user 104. The booking module 206 may determine a time range for the lodging, transportation, and/or activities. The travel component 110 may store and/or access data about the user 104 from user account data 220. The travel component 110 may store and/or access data about the trip from user trip data 222, which may be populated by the booking module 206 and may include current and possibly previous trip information.

The content component 112 may include a content module 208, a recommendation module 210, and a custom content module 212. The content module 208 may determine content that is available for consumption or access by the user 104. The content (e.g., actual media, etc.) and/or content access information (e.g., access to other content providers, etc.) may be stored in content data 226 and may include one or more of user content data 224 (e.g., owned by the user 104), paid content (e.g., subscription content), and/or free content (e.g., promotional content, public content). In some embodiments, the content module 208 may provide the content to the user via a content delivery service. However, the content module 208 may also monitor content access by the user 104 of other sources of content. The content module 208 may track user consumption of content to create user content history.

The recommendation module 210 may recommend content to be made available to the user 104 during a trip, particularly when only a selected portion of the media content can be made available to the user 104 due to various reasons. In some embodiments, the recommendations may be based on user interaction with the content module 206 and/or the user content history, user preferences, and so forth. The recommendations may be based on other data such as current events (e.g., Oscar winners, new releases, etc.), user trends, and other information that may or may not be user-specific. As mentioned above, content access may be restricted because of limited bandwidth during a portion of the trip. Another reason may be based on promotional constraints, where only a limited amount of the content is to be made available to the user 104 (e.g., x number of free movies, x hours of free access, etc.). In some embodiments, the recommendation module 210 may aggregate preferences of various users to recommend a server to prefetch content for use by multiple users. This aggregation may be based on known information about the users, such as booking information, user account data, content preferences, user content history, and so forth.

The custom content module 212 may identify and/or create custom content for the user that may be well suited for the user during the trip. Examples of custom content may include videos, audio, documents, and/or interactive content that pertain to the trip, lodging, and transportation used by the user (e.g., features of these, instruction manual for rental car, etc.), information on regions visited, language guides, and so forth. The custom content may be compiled, assembled, or packaged for convenient access for the user, which may be made available online or offline. For example, the custom content may be a bundle of media content that is provided to the user 104 just prior to the trip, possibly as an electronic book, series of videos, podcasts, and/or a combination thereof.

The configuration component 114 may include a configuration module 214, a prefetch module 216, and/or a promotional module 218. The configuration module 214 may configure access by the user 104 to the media content and/or selected media content (from the recommendation module 210). The configuration module 214 may transmit access information to one or more entities, such as the hospitality entities 118 and/or the transportation entities 120, which may then provide access to the content by the user. In some embodiments, the access may need to be authenticated by the user prior to use. The authentication may be performed using a simplified process, such as by receiving an identifier from the user that associates the user with the user account data 220. As an example, the user 104 may swipe a payment card or enter a portion of a credit card number that is linked to the user account data 220 to authenticate, which may be paired with trip information about the user to authenticate the user (e.g., an expected user in room enters correct identifier, then access is granted). The user may then be granted access to the media content using one of the shared devices 116, such as a video player at the user's hotel room or seat on an aircraft. The configuration module 214 may provide information such as an identifier of the user, a time range of use, and/or other information to facilitate the configuration of the access to the media content or the selected media content.

The prefetch module 216 may cause a device to prefetch some content prior to a portion of the trip that involves limited bandwidth, such as transportation via one of the transportation entities 120. The prefetch module 216 may cause at least some recommended content to be fetched (obtained, downloaded, etc.) in advance, and thus, prefetched. In some instances, the prefetched content may be aggregated content of various users, such as all users on a given flight. Thus, the aircraft's servers may prefetch content that is likely to appeal to passengers based on information accessible from the various user accounts, travel information, and other information about the users (some from the recommendation module 210). As an example, the prefetch module 216 may prefetch some recommended action movies when the recommendation module 210 determines a preference by the user 104 or by an aggregated group of users for action movies based at least in part on user data. In some embodiments, the prefetch module may prefetch content based on some user input.

The promotional module 218 may provide access to at least some content as a promotion. For example, a promotion may provide free or discounted access to some media content while the user 104 is on the trip. The promotion may be associated with the trip or booking of the trip. The promotion may determine the constraints of the access (e.g., who gets access, scope of the access, content to be available, etc.). For example, a promotion may provide a limited quantity of content (e.g., movies) for viewing by the user during the trip, which may be limited to redemption during the trip. In another example, the promotion may include an amount of free time to access the content (e.g., x hours of access) during the trip which would otherwise cost a fee. Other variations of promotions are also contemplated. The promotions may be provided to the user 104 for use of a booking service via the booking module 206 and/or for other reasons.

Figure 2B:
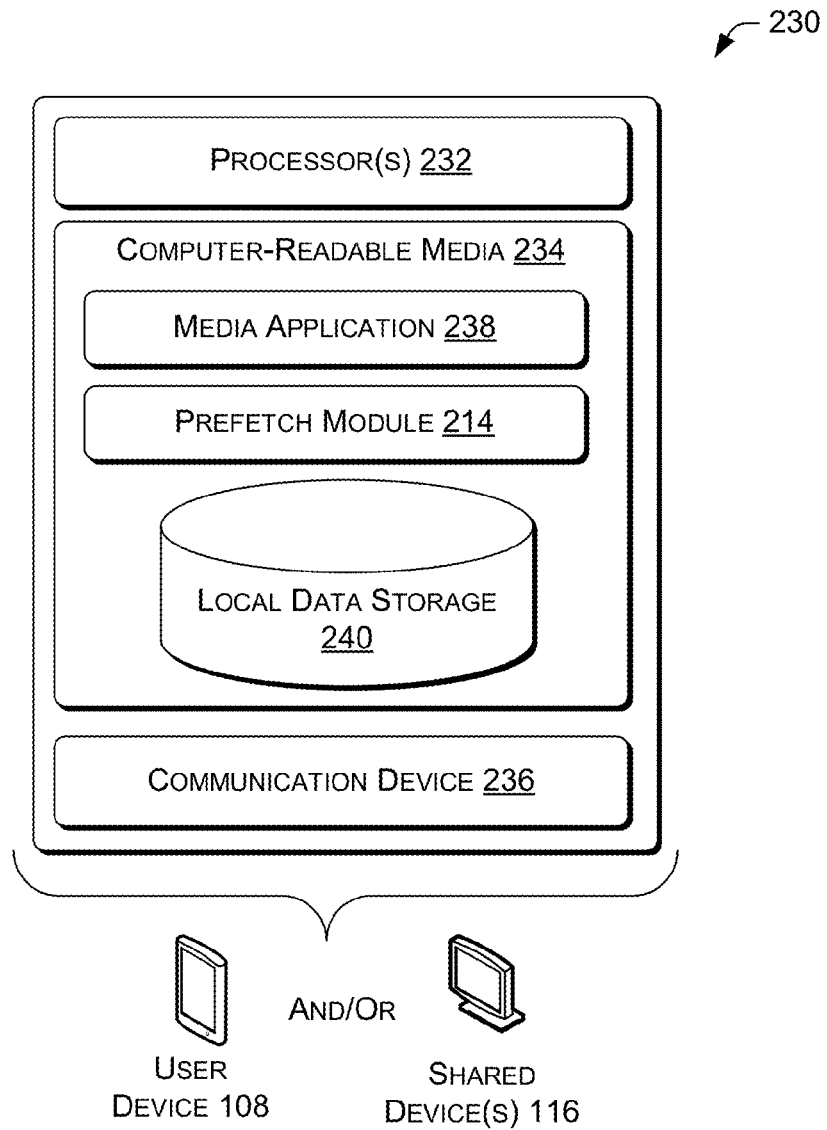
FIG. 2B is a schematic diagram of an illustrative computing architecture of a user device and/or a shared device that facilitates providing access to media content for travelers.

FIG. 2B is a schematic diagram of an illustrative computing architecture 230 of a user device (e.g., the user device 108) and/or a shared device (e.g., the shared device 116) that facilitates providing access to media content for travelers. The computing architecture 230 may include one or more processors 232, one or more computer readable media 234 that stores various modules, applications, programs, or other data, and one or more communication devices 236 to access remote content via the network 106. The computer-readable media 234 may include instructions that, when executed by the one or more processors 232, cause the processors to perform the operations described herein for the user device 108 and/or the shared device 116. The computer-readable media 234 may be similar or the same as the computer-readable media 204 that is described above.

In some embodiments, the computer-readable media 234 may store a media application 238 and/or a prefetch module 214. The media application 238 may provide access to at least some media content. The media content may be videos, audio, and/or documents as discussed above. The media application 234 may interact, directly or indirectly, with the configuration component 114 to configure access to at least some content. For example, when the device is the shared device, the configuration component 114 may instruct the media application to provide access to specific media for the user 104 during a specified time range associated with at least a portion of the trip conducted by the user 104.

The prefetch module 214, when used with the user device 108 and/or the shared device 116, may prefetch content for storage in local data storage 240. In some embodiments, the prefetch module 214 may communicate with one or more components of the service provider 102 to determine content to prefetch, possibly without input from the user 104. In an example, the prefetch module 214 may determine that the user 104 has booked a flight that will last a predetermined amount of time in duration and is scheduled to occur at a specific time. The prefetch module 214 may fetch and store a predetermined amount of content on the local data storage prior to the flight. The amount of the content may be based on the duration of the flight, storage capacity, user input/settings, and/or other relevant factors. In some embodiments, the prefetch module 214 may identify the occurrence of the trip based on messages, calendar entries, and/or other information stored on the user device 108 or accessed by the user device 108. The prefetch module 214 may also determine an amount of content to download (prefetch) prior to the trip based on various possible data, such as the length of the trip, consumption usage patterns by the user, and so forth. Additional information about the use of the prefetch module in this manner is described with reference to the processes below, and in particular, in reference to FIG. 8.

Illustrative Operation

FIGS. 3-6 and 8 are flow diagrams of illustrative processes. The processes are illustrated as collections of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 3:
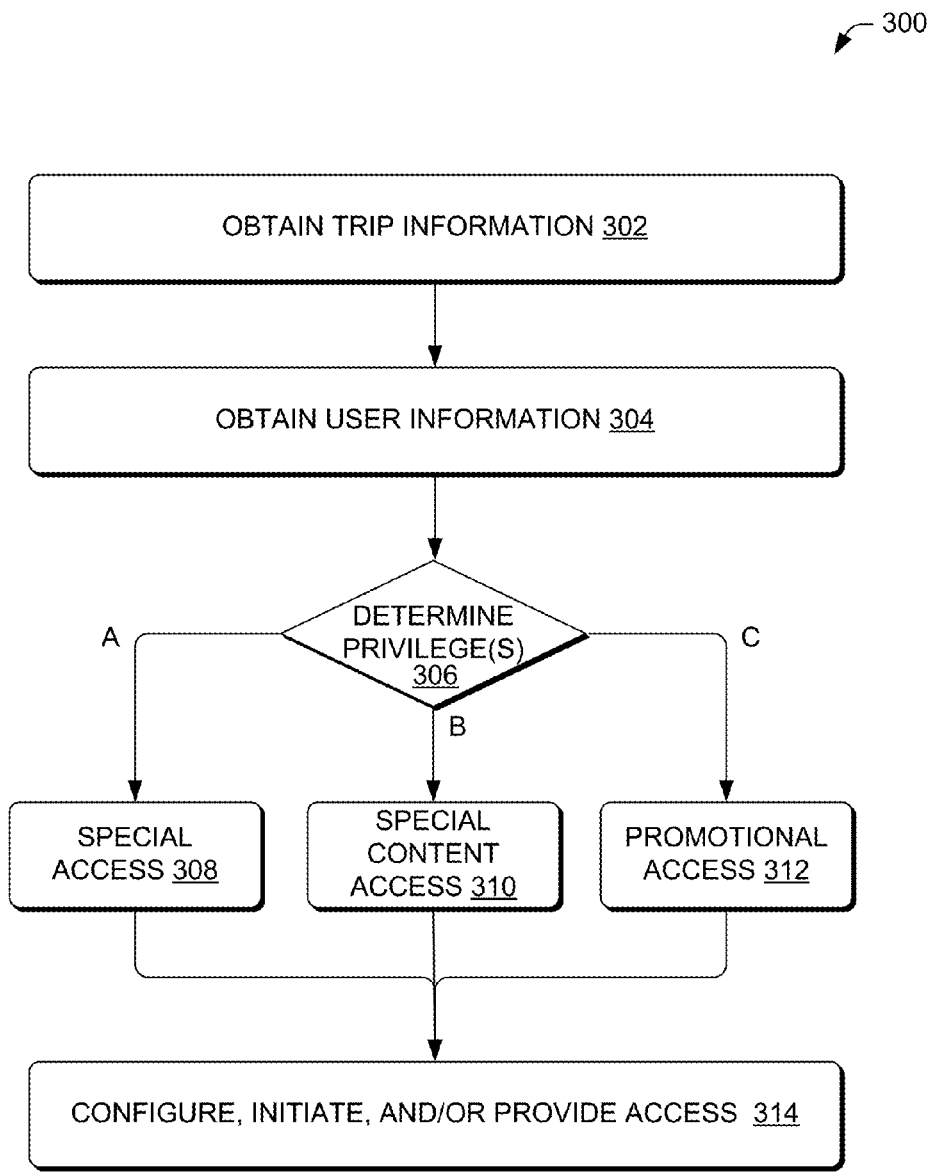
FIG. 3 is a flow diagram of an illustrative process to determine media content and/or access to content to provide to a traveler.

FIG. 3 is a flow diagram of an illustrative process 300 to determine media content and/or access to content to provide to a traveler. The process 300 is described with reference to the environment 100 and may be performed by the service provider 102. Of course, the process 300 may be performed in other similar and/or different environments. The process 300 is a high level process that describes types of access and/or media content that may be made available to a user during a trip.

At 302, the travel component 110 may obtain trip information for the user 104. In some embodiment, the trip information may be information obtained from the booking module 206 or from other entities and/or services that book one or more aspects of a trip, such as lodging, transportation, and/or activities. The trip information may include entities included in participation of the trip (e.g., hotels, transportation providers, etc.), time ranges, an identity of the user 104, and so forth.

At 304, the travel component 110 and/or the content component 112 may obtain user information 304. The user information may include user description information, address/contact information, payment information, transaction history, preferences, device information, and/or other data about the user 104 that can be used to configure access of the media content, select the media content, recommend media content, and so forth.

At 306, the content component 112 and/or the configuration component 114 may determine privileges for the user 104 based on one or more of the trip information from the operation 302 and/or the user information from the operation 304. Following a first route "A", at 308, the determined privilege may be special access to content that is now universally available to all users. For example, the user 104 may be granted access to additional media content that is made available from a server in an aircraft, but otherwise not available to some passengers, or made available to the user 104 at a discount or for free while other users have to pay for such content. In another example, the user 104 may have special access to streaming content while other uses may be prohibited or restricted from streaming content when interacting with a limited-bandwidth entity. Following a second route "B", at 310, the determined privilege may be access to special content (e.g., custom content, other content, such as content created or compiled specifically for the user 104 or group of users). The special content may be created or compiled by the custom content module 212, as described above. Following a third route "C", at 312, the determined privilege may be promotional access. The promotional access may be provided by the promotional module 218 as described above.

At 314, following one or more of the operations 308, 210, and/or 312, the configuration component 114 and/or the content component 112 may configure, initiate, and/or provide access to the content determined via the privilege(s) in the decision operation 306. For example, at 314, the configuration module 214 may transmit a message to an entity to cause the entity to provide determined access and/or media content to the user 104 via one of the shared devices 116 (e.g., a shared device in a hotel room booked for the user, a shared device associated with a seat assigned to the user by a transportation service, etc.).

Figure 4:
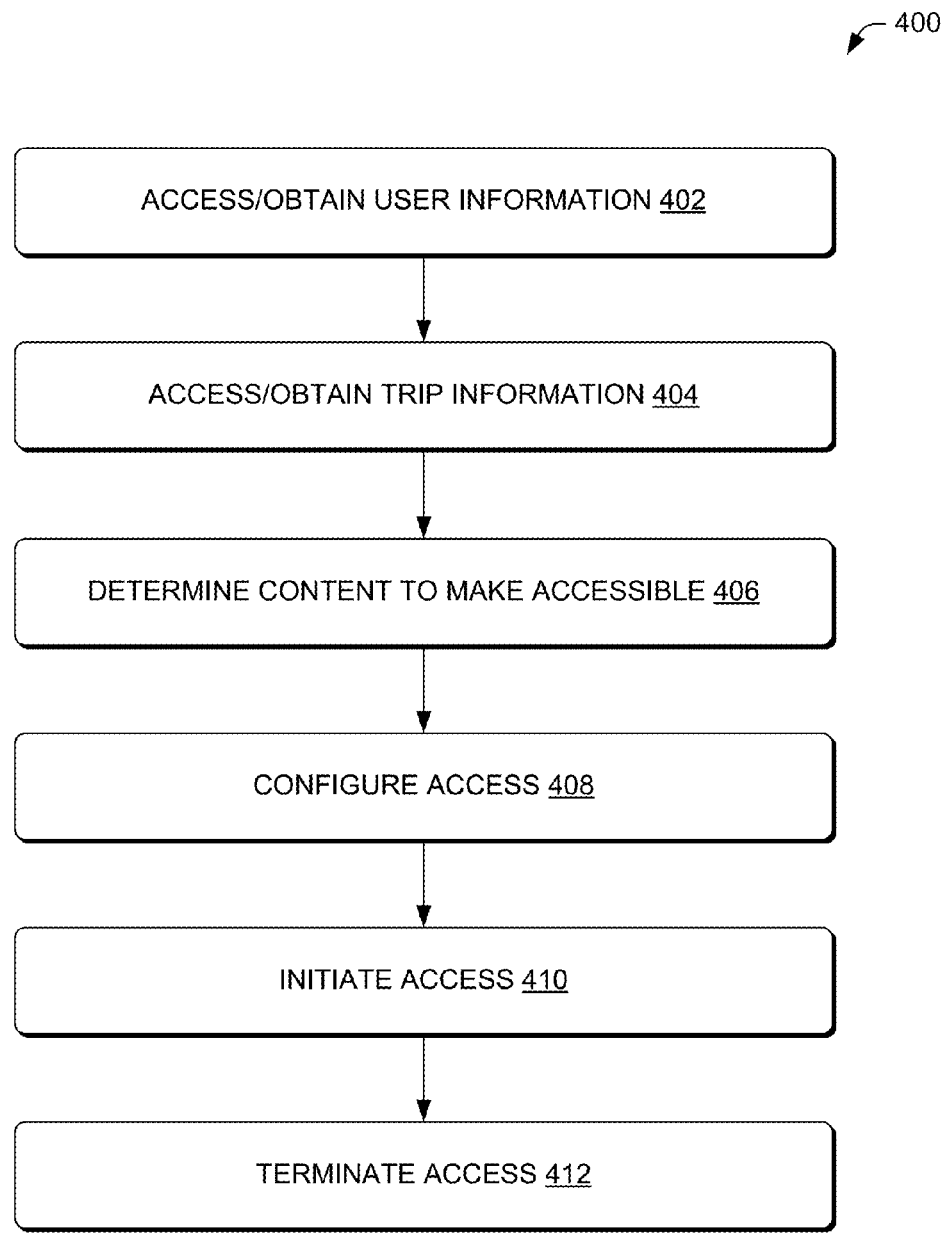
FIG. 4 is a flow diagram of an illustrative process to configure media content for access by travelers.

FIG. 4 is a flow diagram of an illustrative process 400 to configure media content for access by travelers. The process 400 is described with reference to the environment 100 and may be performed by the service provider 102. Of course, the process 400 may be performed in other similar and/or different environments.

At 402, the travel component 110 and/or the content component 112 may access and/or obtain user information. As discussed above in the operation 304, the user information may include user description information, address/contact information, payment information, transaction history, preferences, device information, and/or other data about the user 104 that can be used to configure access of the media content, select the media content, recommend media content, and so forth. In some embodiments, the user information may be obtained by the booking module 206 while booking at least a portion of a trip for the user 104.

At 404, the travel component 110 may access and/or obtain trip information. As discussed above in the operation 302, the trip information may be information obtained from the booking module 206 or from other entities and/or services that book one or more aspects of a trip, such as lodging, transportation, and/or activities. The trip information may include entities included in participation of the trip (e.g., hotels, transportation providers, etc.), time ranges, destination(s), an identity of the user 104, and so forth. In some embodiments, the booking module 206 may obtain the trip information while or during a booking process that obtains and/or schedules one or more of lodging, transportation, and/or activities for the user 104.

At 406, the content component 112 may determine content to make accessible to the user during the trip. In some embodiments, the content component 112 may make all or most of the user's content available to the user during the trip, such as via one of the shared devices 116. For example, the content component 112 may enable the user 104 to stream content during the trip as if the user was at home or streaming from a usual location/device. However, in some instances, the content component 112 may have to select a portion of the content for access by the user 104 during the trip, such as when the user is traveling in an environment that has limited bandwidth for streaming from external content providers. In such instances, the content component 112 may select content automatically, using user input, or both.

When the content component selects content for the user, the selection may be based at least in part on the user information from the operation 402 and/or the trip information from the operation 404. The selected content may include selections of content that are similar to those previously watched or consumed by the user. The content may include recommendations based on content consumed by other users that previously consumed similar content as the user. The content may include new releases and/or currently trending content, such as recent movies nominated for the Oscars. In some instances, when the user has accessed a title in a series of content, the selected content may include a next one or more of the titles in the series of content. In some embodiments, the content may be selected based on an association with the destination, such as titles related to the destination, content used to educate the user about the destination, and so forth. Other recommendation and/or suggestion algorithms may be used to select content to provide to the user.

At 408, the configuration component 114 may configure access to the media content determined at the operation 406. The configuration component 114 may configure, directly or indirectly, one of the shared devices 116 to provide access by the user 104 during at least a portion of the trip. For example, the configuration component 114 may transmit user information to a hospitality entity, which may then configure or set up a shared device (e.g., a smart television, a set top box, a computing device, etc.) to enable the user to access the media content in the user's room during the user's stay. In some embodiments, the access may require some authentication by the user, as discussed above. However, the access may be provided without the user having to enter passwords and other information. The access may be terminated in response to the user checking out of the hotel. As another example, the configuration component 114 may transmit user information to a transportation entity to cause the transportation entity to prefetch content for the user and possibly for other users. The user may then have access to the prefetched content during transport by the transportation entity. The access may be provided by streaming content from a local server that provides the content to a device associated with the user, such as a shared device at a seat assigned to the user or to the user device 108. In some embodiments, the configuration module 214 may enable changing access rights and/or configurations relatively quickly and easily for instances where a user is assigned a different location (e.g., different room, different seat, etc.). For example, the configuration module 214 may verify that the content is configured for a same location that is ultimately assigned to the user. When the location is different, the configuration module 214 may update the configuration accordingly to provide access by the user in the new location. The new location may be verified before changes may be implemented. The verification may be performed by the user, the device, and/or a service representative.

At 410, the configuration component 114 may initiate the access to the media content. However, the access may also be initiated by other devices, such as devices controlled by the various entities (e.g., hospitality entity, transportation entity, etc.). The initiation may be coordinated with a time or event included in the trip, such as when the user checks into a hotel room or boards an aircraft or a cruise ship.

At 412, the configuration component 114 may terminate the access to the media content. However, the access may also be terminated by other devices, such as devices controlled by the various entities (e.g., hospitality entity, transportation entity, etc.). The termination may be coordinated with a time or event included in the trip, such as when the user checks out of a hotel room or exits an aircraft or a cruise ship. In some embodiments, the termination may be a predetermined amount of time after the initiation of the access, such as an amount of time projected for a flight booked for the user 104.

Figure 5:
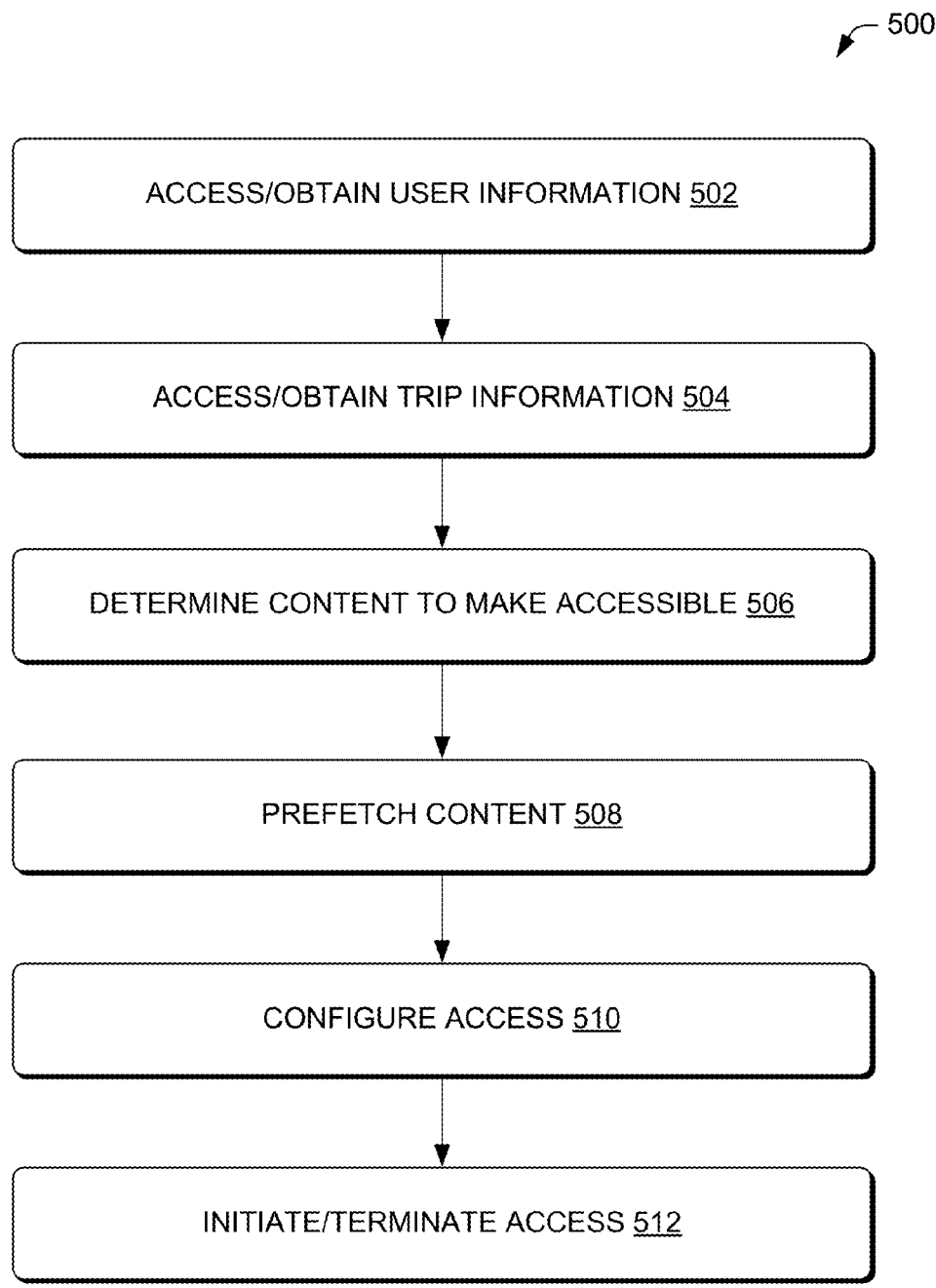
FIG. 5 is a flow diagram of an illustrative process to prefetch media content to enable access by travelers that may otherwise have limited access to streamed content.

FIG. 5 is a flow diagram of an illustrative process 500 to prefetch media content to enable access by travelers that may otherwise have limited access to streamed content. The process 500 is described with reference to the environment 100 and may be performed by the service provider 102. Of course, the process 500 may be performed in other similar and/or different environments.

At 502, the travel component 110 and/or the content component 112 may access and/or obtain user information. As discussed above in the operations 304 and 402, the user information may include user description information, address/contact information, payment information, transaction history, preferences, device information, and/or other data about the user 104 that can be used to configure access of the media content, select the media content, recommend media content, and so forth. In some embodiments, the user information may be obtained by the booking module 206 while booking at least a portion of a trip for the user 104.

At 504, the travel component 110 may access and/or obtain trip information. As discussed above in the operation 302 and 404, the trip information may be information obtained from the booking module 206 or from other entities and/or services that book one or more aspects of a trip, such as lodging, transportation, and/or activities. The trip information may include entities included in participation of the trip (e.g., hotels, transportation providers, etc.), time ranges, an identity of the user 104, and so forth. In some embodiments, the booking module 206 may obtain the trip information while or during a booking process that obtains and/or schedules one or more of lodging, transportation, and/or activities for the user 104.

At 506, the content component 112 may determine content to make accessible to the user during the trip. As discussed above in the operation 406, the content component 112 may have to select a portion of the content for access by the user during the trip, such as when the user is traveling and has limited bandwidth for streaming from external content providers. In such instances, the content component 112 may select content automatically, using user input, or both. When the content component selects content for the user, the selection may be based at least in part on the user information from the operation 502 and/or the trip information from the operation 504. In some instances, the determined content may be determined based on aggregated user data and trip information from a plurality of users, such as the plurality of users that are on a same flight or on a same cruise ship.

At 508, the prefetch module 216 may cause the media content determined at the operation 506 to be prefetched. In some embodiments, the prefetching may be performed by a server that is local to a mode of transport, such as a server on an aircraft, on a passenger ship (e.g., cruise ship), on a train, on a bus, and so forth. In various embodiments, the prefetch may be performed by the user device 108 to prefetch content automatically for the user prior to transit by the user 104 during the trip. The user device 108 may download content, such as recommended content based on predetermined thresholds (available storage, length of trip, etc.).

In some embodiments, the prefetch module 216 may perform prefetch operations to improve or maximize a quality of service (QOS). For example, the prefetch module 216 may be implemented by a user device or by a shared device of a hospitality entity to prefetch content so that the content is more readily available in response to a request to access the content.

At 510, the configuration component 114 may configure access to the media content determined at the operation 506 and prefetched at the operation 508. The configuration component 114 may configure, directly or indirectly, one of the shared devices 116 to provide access by the user 104 during at least a portion of the trip. For example, the configuration component 114 may transmit user information to a transportation entity to cause the transportation entity to allow the user to access the prefetched content. The user may then have access to the prefetched content during transport by the transportation entity. The access may be provided by streaming content from a local server that provides the content to a device associated with the user, such as a shared device at a seat assigned to the user or to the user device 108.

At 512, the configuration component 114 may initiate and/or terminate the access to the media content. However, the access may also be initiated and/or terminated by other devices, such as devices controlled by the various entities (e.g., hospitality entity, transportation entity, etc.). The initiation and/or termination may be coordinated with a time or event included in the trip, such as when the user boards/exits an aircraft or a cruise ship.

Figure 6:
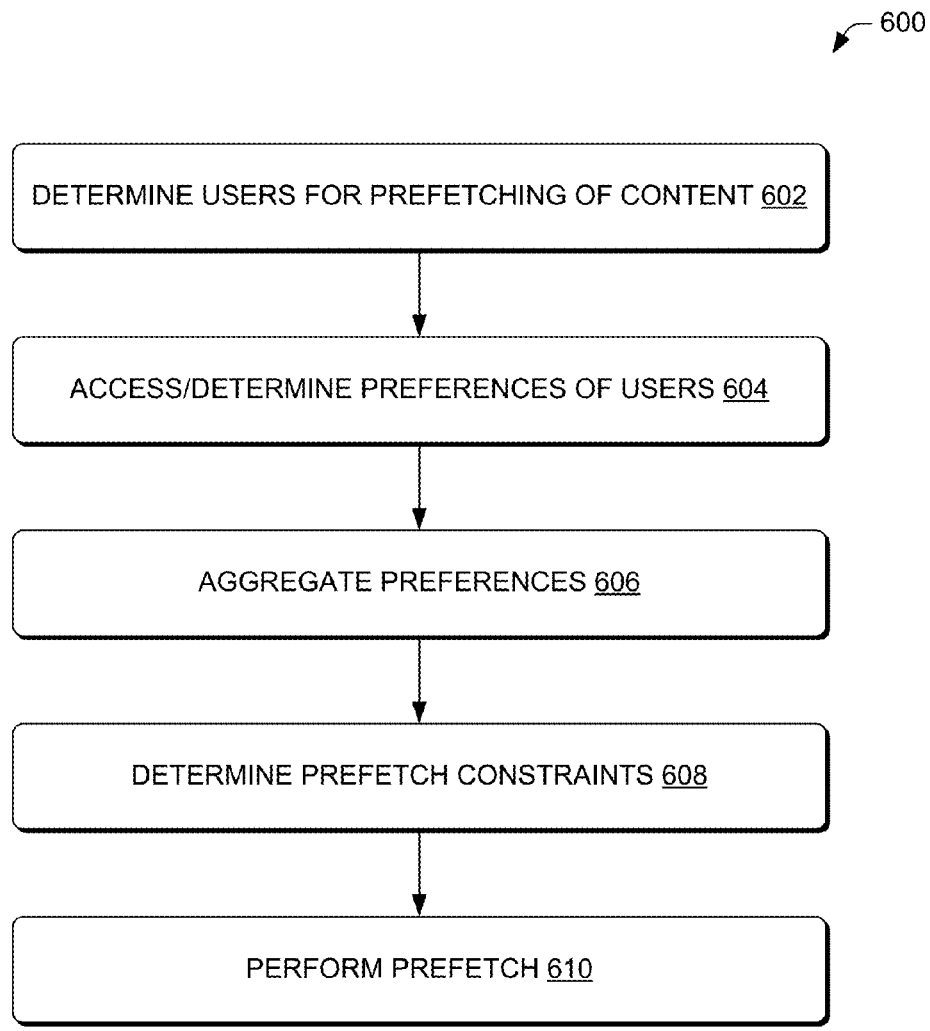
FIG. 6 is a flow diagram of an illustrative process to identify content to be prefetched for travelers.

FIG. 6 is a flow diagram of an illustrative process 600 to identify content to be prefetched for travelers. The process 600 is described with reference to the environment 100 and may be performed by the service provider 102. Of course, the process 600 may be performed in other similar and/or different environments.

At 602, the prefetch module 216 may determine users for prefetching of media content. For example, the users may be booked on a same flight, on a same cruise, on a same instance of transport (e.g., bus, train, etc.).

At 604, the prefetch module 216 may access and/or determine preferences of the users. The preferences may be determined based on user settings, user history, content previously accessed by the users, trip information for the users (e.g., final destination, places to visit, etc.), and/or other inputted and/or retrievable information. The preferences may be used by the recommendation module 210 to identify media content to be prefetched for the user or the group of users.

At 606, the preferences may be aggregated to determine preferences for the group of users. In some embodiments, the aggregation may be performed after recommended media content is determined using the preferences. Thus, the most popular types of media content or items of media content may be identified for prefetching.

At 608, the prefetch module 216 may determine constraints for the prefetching. The constraints may include storage limitations for the prefetched content (e.g., storage space for a server on a mode of transit, etc.), time to obtain the media content (e.g., only limited time to access external content sources), bandwidth available when accessing external content sources, length of the trip (e.g., expected duration of a flight, a cruise, etc.), number of passengers, and so forth.

At 610, the prefetch module 216 may prefetch the recommended media content based at least in part on the constraints. The group of users may then be granted access to the media content during the trip and/or possibly at other times.

Illustrative Special Content

Figure 7:
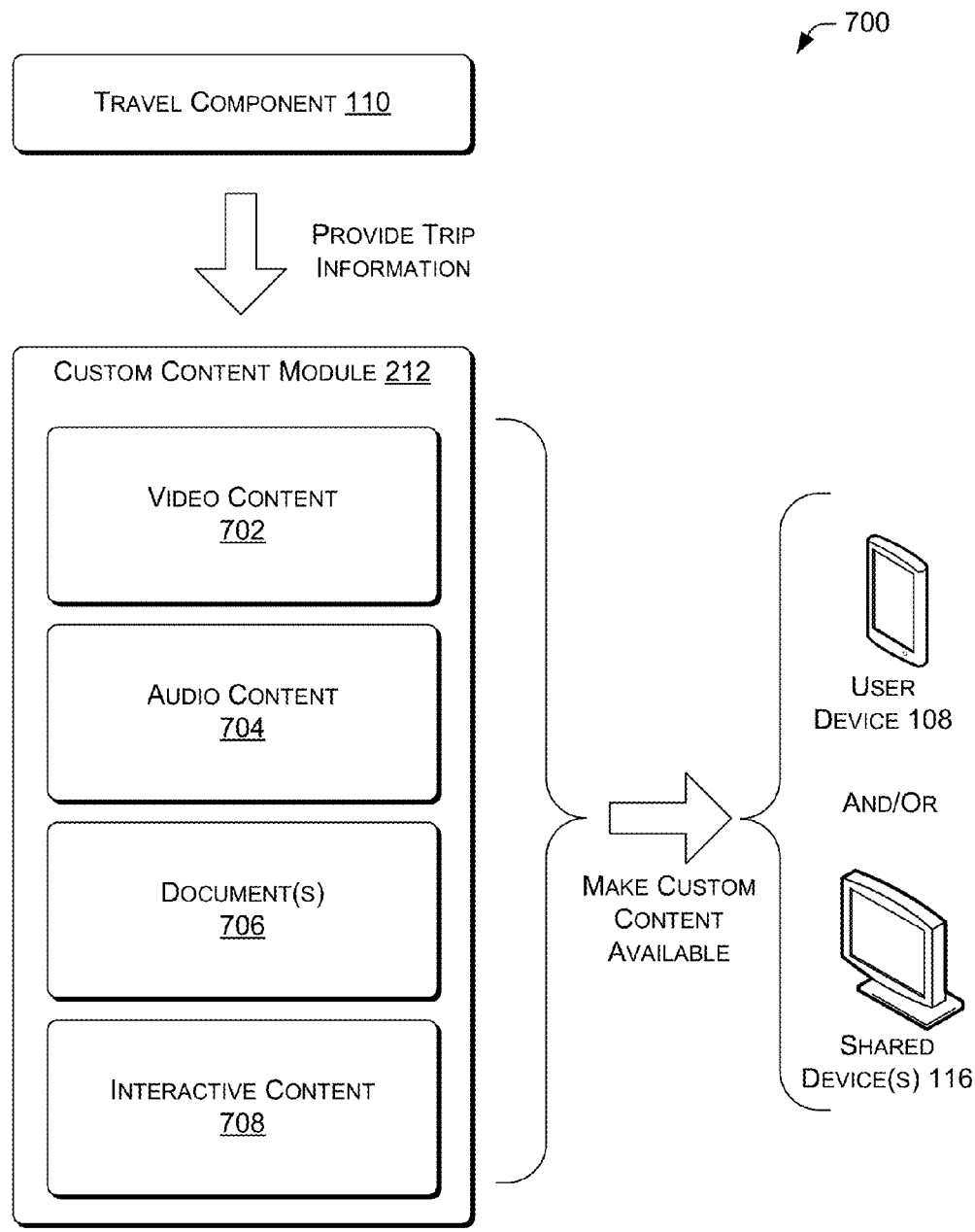
FIG. 7 is a block diagram of illustrative media content that may be provided to a user device associated with a traveler.

FIG. 7 is a block diagram of illustrative media content 700 that may be provided to a user device and/or a shared device associated with a traveler. As shown in FIG. 7, the travel component may transmit information to the custom content module 212, such as trip information, user information, and/or other relevant information that may be used to select custom content for the user. The custom content module 212 may select items from various available content, which may include video content 702, audio content 704, documents 706 (e.g., text documents, files, images, maps, etc.), and/or interactive content (e.g., games, etc.). The customer content module 212 may assemble a collection or compilation of the content from one or more of the various types of content, and then distribute this content or make this content available for access by the user 104 during the trip via the user device 108 and/or one of the shared devices 116. The collection/compilation may be selected to assist the user during the trip.

For example, the custom content module 212 may create a trip guide for the user that includes documentation (from the documentation content 706) that is relevant to the user's trip. The documentation may include language guides (e.g., translations, frequent phrases, etc.), maps, images of importance, instructions for lodging/transportation, schedules, and so forth. The custom content module 212 may include at least some of the audio content 704, which may include a podcast, walking audio tour, audio book, and so forth that are related to the user's trip. The custom content module 212 may include at least some of the video content 702, which may include a short instructional videos, travel guides, relevant movies and so forth.

In some embodiments, the custom content module 212 may create custom audio and/or custom video using a fully automated process and/or partially automated process (which may include some human intervention). For example, the custom content module 212 may create a custom video that provide explanations and introductory information to a user about a particular trip that the user has booked. The custom video may include information about modes of transit, lodging, and areas to be visited. The customer video may be compiled by selecting a plurality of shorter videos that include relevant content. For example, one of the shorter videos may include information about a specific hotel while another one of the shorter videos may include information about restaurants in a region.

The custom content module 212 may include at least some of the interactive content 708, which may include an interactive game, an interactive tour, an application (and/or dedicated "app"), application updates, and so forth. The custom content module 212 may make the selected content available in a single repository or using various repositories. Access to the content may be limited to specific times associated with the trip. In some embodiments, the content may be provided to the user device 108 via a download. However, the content may be streamed to the user device 108 and/or one of the shared devices 116 or otherwise made accessible by one or more of these devices.

Figure 8:
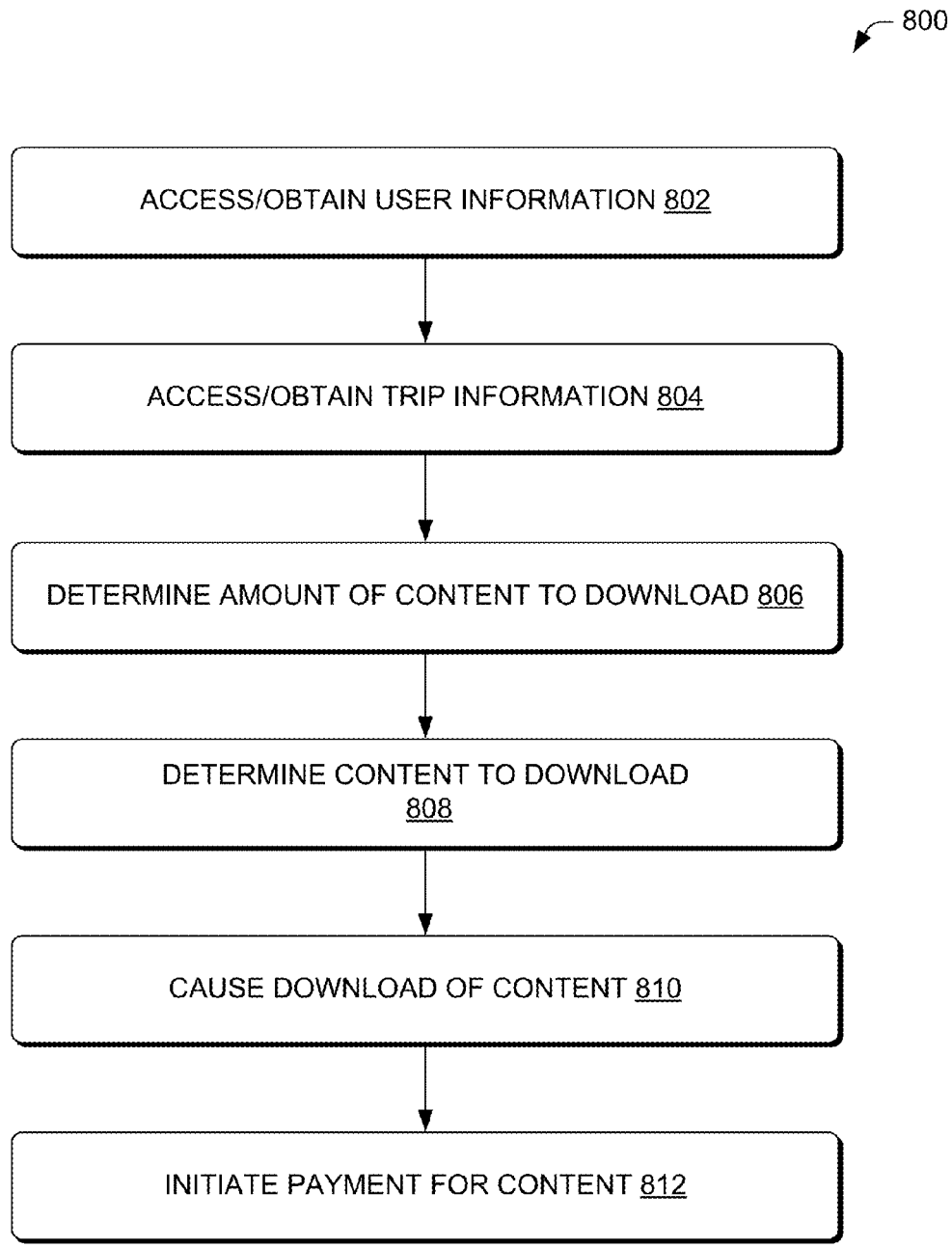
FIG. 8 is a flow diagram of an illustrative process to cause download of media content to a user device of a traveler before a trip.

FIG. 8 is a flow diagram of an illustrative process 800 to cause download of media content to a user device of a traveler before a trip. The process 800 is described with reference to the environment 100 and the computing architecture 230, and may be performed by the service provider 102 and/or by the user device 108. Of course, the process 800 may be performed in other similar and/or different environments.

At 802, user information may be accessed or obtained by the user device 108 and/or by the service provider 102. As discussed above in the operation 304, the user information may include user description information, address/contact information, payment information, transaction history, preferences, device information, and/or other data about the user 104 that can be used to configure access of the media content, select the media content, recommend media content, and so forth. In some embodiments, the user information may be obtained by the booking module 206 while booking at least a portion of a trip for the user 104.

At 804, trip information may be accessed or obtained by the user device 108 and/or by the service provider 102. As discussed above in the operation 302, the trip information may be information obtained from the booking module 206 or from other entities and/or services that book one or more aspects of a trip, such as lodging, transportation, and/or activities. The trip information may include, time ranges, an identity of the user 104, destination(s), and so forth. In some embodiments, the booking module 206 may obtain the trip information while or during a booking process that obtains and/or schedules one or more of lodging, transportation, and/or activities for the user 104. In various embodiments, the trip information may be obtained from analysis of information associated with a calendar. For example, a calendar may include an entry or event associated with travel, such as a scheduled event to board an aircraft, travel by car, and so forth. The entry may include information about a time frame of the trip and/or other relevant information. The entry may be created using a specific format or may be identified based on keywords or other information in the entry. The calendar may be a third party calendar and may be accessible via back-end services, such as when the calendar is stored in a remote location. The calendar may have permissions that allow selectable access to the calendar by other parties.

In some embodiments, the trip may be identified based on a message received by the user device, such as a message that indicates an upcoming trip to be performed by the user associated with the user device 108. The message may include information about the time frame, the destination, and so forth. The message may be an electronic mail (email), a simple message service (SMS), or any other type of text-based message.

At 806, the user device 108 and/or the service provider 102 may determine an amount of content to download to the user device 108 for the trip. The amount of information may be based on one or more of storage constraints of the user device 108, the time range/frame of the trip, content access patterns from previous trips of the user, amount of time available to download content, a bandwidth of network connectivity used to provide the content to the user device 108, and/or content available for download.

At 808, the content to be downloaded to the user device 108 may be selected or determined. The content may be selected or determined based at least in part on the amount determined from the operation 806. The selection may be based at least in part on the user information from the operation 802 and/or the trip information from the operation 804. The selected content may include selections of content that are similar to those previously watched or consumed by the user. The content may include recommendations based on content consumed by other users that previously consumed similar content as the user. The content may include new releases and/or currently trending content, such as recent movies nominated for the Oscars. In some instances, when the user has accessed a title in a series of content, the selected content may include a next one or more of the titles in the series of content. In some embodiments, the content may be selected based on an association with the destination, such as titles related to the destination (e.g., "When Harry Met Sally" for a trip to New York or "The Hangover" for a trip to Las Vegas, content used to educate the user about the destination, and so forth. The content may be selected based on a time of the travel (e.g., day, night, evening). The content may be selected based on others included in the travel, such as a spouse, children, etc. The content may be selected based on other devices included in the travel such as when the other devices may also include content. Thus, the content selection may attempt to avoid redundancy of content across devices. In some embodiments, the selection may be based at least in part on a success or access of previously selected content from one or more previous trips. For example, if the user did not access some types of content in previous trips, then these types of content may be phased out and omitted in future prefetch selections. Other recommendation and/or suggestion algorithms may be used to select content to provide to the user, such as those described above in FIGS. 1-7.

At 810, the content may be caused to be downloaded to the user device 108 or by the user device 108. For example, the user device 108 may initiate a download without user action to obtain the content determined/selected at the operation 808 so that the user has access to the content during the trip. In some embodiments, the user may be prompted to authorize at least an operation associated to the downloading, such as to provide approval for the download or view a message that indicates an occurrence of the download. Other minimal user interaction is also contemplated.

At 812, a payment for the content may be initiated. The payment may be initiated before the download, just prior to access of the content, or after access of the content. In some embodiments, content may be purchased by the user in advance, such as in subscription schemes, when the user purchases items in advance (previously owned, etc.) and so forth. The content may also be provided without a payment, such as promotional content, which may be provided via the process 800 with omission of the operation 812.

In various embodiments, content may be downloaded to the user device 108 prior to purchase of the content. The user may be requested to pay for the content prior to accessing the content (e.g., via a prompt when attempting to access the content) and/or after at least partial consumption of the content, such as after the user device regains network connectivity to a payment provider (e.g., via network access, etc). When paying before accessing the content, but after download of the content, the payment may be performed by a relatively small transmission of data (as compared to the size of a transmission of the downloaded content), and may result in unlocking access to the content (e.g., decrypting, etc.). Thus, payments may be initiated after download of the content and possibly after access of the content. Such instances may accommodate users that download content before losing, at least temporarily, access to network connectivity. In some embodiments, the content may be unlocked after processing of a payment. In various embodiments, an existing account may be debited after consumption of the content when the content is not paid for in advance.

In some embodiments, the content downloaded may be deleted from the user device or made inaccessible after the time frame of the trip. For example, some of the content may be automatically deleted to free up storage space on the user device, such as content that has not been accessed or has been completely accessed (e.g., completed). The content may be made inaccessible, for example, when the content is provided as a promotion and is restricted to use during the trip. This content may also be deleted.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
one or more hardware processors;
memory; and
one or more computer-executable instructions stored in the memory and executable by the one or more hardware processors to perform acts comprising:
receiving, for a user, booking information for a trip to a destination and a time frame of the trip;
accessing historical user data that indicates previous access of media content by the user;
identifying a first device and a second device associated with the user;
determining at least one of lodging, mode of transportation, or at least one activity for the trip based at least in part of the booking information;
selecting recommended media content to download to the first device and the second device based at least in part on the historical user data, the destination, and the at least one of the lodging, the mode of transportation, or the at least one activity for the trip;
determining a distribution of the recommended media content to the first device and the second device in order to at least one of reduce or avoid media content redundancy on the first device and the second device;
determining an amount of the recommended media content to download to the first device and the second device based at least in part on the time frame of the trip and the historical user data; and
causing download of the amount of the recommended media content to the first device and the second device.

2. The system as recited in claim 1, further comprising determining a latest title in a series of media content that the user has accessed, and wherein the selecting the recommended media content includes selecting a next title that is subsequent to the latest title in the series of media content that the user has accessed.

3. The system as recited in claim 1, wherein the historical user data indicates previous media accessed by the user from the first device while excluding at least some user data generated from use of the second device.

4. The system as recited in claim 1, wherein the media content includes at least one of subscription-based media content or personal media content that is stored in or accessible from a remote network-accessible service.

5. The system as recited in claim 1, wherein at least a portion of the amount of the recommended media content includes restricted content that is accessible only during the time frame of the trip, and wherein the acts further comprise causing the restricted content to be deleted from the first device and the second device at a time that is subsequent to an end of the time frame of the trip.

6. A method, comprising:
identifying, by a server device and via a user device associated with a user, information about travel to be performed by the user, the information including at least a time frame of the travel performed by the user and at least one of lodging, mode of transportation, or at least one activity of the travel performed by the user;
accessing, by the server device, historical user data that indicates previous access of media content by the user;
determining, by the server device and prior to the travel, an amount of content to store on the user device based at least in part on the time frame of the travel and the historical user data, wherein the amount of content is associated with a time used to consume the content;
determining, by the server device, specific titles of the content to download to the user device prior to the travel based at least in part on the amount of content to be stored on the user device and the at least one of the lodging, the mode of transportation, or the at least one activity of the travel, wherein at least one of the specific titles of the content is an access restricted content;
causing, by the server device, download of the specific titles of the content to the user device; and
granting access to the access restricted content based at least in part on a determination, via the user device, that the user is traveling.

7. The method as recited in claim 6, wherein the content includes at least one of a video, an electronic book, an audio file, an application, or an electronic game.

8. The method as recited in claim 6, wherein the identifying includes accessing a calendar associated with the user to identify the travel and the time frame of the travel.

9. The method as recited in claim 6, wherein the identifying includes receiving a message that includes a notification of the travel, the time frame, and a destination of the travel.

10. The method as recited in claim 6, wherein the determining the specific titles of the content to download to the user device includes selecting at least one specific title based at least in part on a destination of the travel.

11. The method as recited in claim 6, wherein the determining the specific titles of the content to download to the user device includes selecting at least some of the specific titles to assist the user during the travel based at least in part on the at least one of the lodging, the mode of transportation, or the at least one activity of the travel.

12. The method as recited in claim 6, wherein the determining the specific titles of the content is further based at least in part on analysis of the historical user data.

13. The method as recited in claim 6, wherein the determining the amount of content to store on the user device is further based on at least one of an amount of storage available on the user device or an average consumption rate of media content by the user during one or more previous trips.

14. The method as recited in claim 6, further comprising:
prompting, via the user device, the user to purchase the access restricted content after consumption of at least a portion of the access restricted content;
removing access restriction, in response to a user purchase, on the access restricted content; and
causing the access restricted content that was not purchased to be deleted from the user device at a time that is subsequent to an end of the time frame of the travel.

15. One or more non-transitory computer-readable media storing computer-executable instructions that, when executed on one or more processors, performs acts comprising:
identifying, by a server device, at least a time frame of a trip planned for a user;
identifying, by the server device, a travel companion for the trip planned;

accessing, by the server device, user data that indicates a content preference of the user;

accessing, by the server device, companion information associated with the travel companion;

determining, by the server device, whether to provide a language guide for the user based at least in part on a destination of the trip and the user data;

selecting, by the server device, media content to download to a user device associated with the user based at least in part on the user data and the companion information;

determining, by the server device, an amount of the media content to download to the user device prior to the trip based at least in part on the time frame of the trip and the user data; and causing download, to the user device, of the media content prior to the trip, the media content made accessible after the download to the user device during the time frame of the trip.

16. The one or more non-transitory computer-readable media as recited in claim 15, wherein the identifying includes receiving a message that identifies the trip and the time frame of the trip.

17. The one or more non-transitory computer-readable media as recited in claim 15, wherein the identifying includes accessing a calendar associated with the user to identify the trip and the time frame of the trip.

18. The one or more non-transitory computer-readable media as recited in claim 15, wherein the selecting the media content to download to the user device is based at least in part on analysis of content previously accessed by the user via the user device.

19. The one or more non-transitory computer-readable media as recited in claim 15, wherein the selecting the media content to download to the user device includes selecting at least a portion of the media content based at least in part on the destination of the trip.

20. The one or more non-transitory computer-readable media as recited in claim 15, wherein the acts further comprise causing a purchase of at least a portion of the media content after download of the at least the portion of the media content to the user device.

* * * * *